(12) United States Patent
Nabeta (10) Patent No.: US 9,647,382 B2
(45) Date of Patent: May 9, 2017

(54) CONNECTOR TERMINAL HAVING A TWO-PART WATERPROOF CASE

(71) Applicant: Yazaki Corporation, Tokyo (JP)

(72) Inventor: Yasunori Nabeta, Makinohara (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 14/202,500

(22) Filed: Mar. 10, 2014

(65) Prior Publication Data

US 2014/0194003 A1  Jul. 10, 2014

Related U.S. Application Data

(63) Continuation of application No. PCT/JP2012/073967, filed on Sep. 12, 2012.

(30) Foreign Application Priority Data

Sep. 12, 2011 (JP) .................. 2011-198554

(51) Int. Cl.
*H01R 4/18* (2006.01)
*H01R 13/52* (2006.01)
*H01R 4/70* (2006.01)

(52) U.S. Cl.
CPC ......... *H01R 13/5221* (2013.01); *H01R 4/185* (2013.01); *H01R 4/70* (2013.01); *H01R 13/5216* (2013.01); *H01R 4/18* (2013.01); *H01R 13/52* (2013.01)

(58) Field of Classification Search
CPC . H01R 4/18; H01R 4/70; H01R 13/52; H01R 13/5216
USPC ................ 439/604, 606, 521, 278, 282, 430
See application file for complete search history.

(56) References Cited

U.S. PATENT DOCUMENTS

| 5,326,273 A * | 7/1994 | Kamon .................... H01R 4/62 174/94 R |
| 5,821,461 A | 10/1998 | Sackett |
| 5,875,547 A | 3/1999 | Larsson et al. |
| 7,682,204 B2 * | 3/2010 | Tokairin ............... H01R 13/405 29/858 |

(Continued)

FOREIGN PATENT DOCUMENTS

| CN | 101352113 A | 1/2009 |
| GB | 2 319 906 A | 6/1998 |

(Continued)

OTHER PUBLICATIONS

International Search Report (PCT/ISA/210), dated Dec. 5, 2012, issued by the International Searching Authority in counterpart International Patent Application No. PCT/JP2012/073967.

(Continued)

*Primary Examiner* — Gary Paumen
*Assistant Examiner* — Paul Baillargeon
(74) *Attorney, Agent, or Firm* — Sughrue Mion, PLLC (57) ABSTRACT

A connector terminal includes a barrel part capable of attaching thereto a conductor exposed from an outer skin of an electric wire to cause to conduct and connect, and a terminal part caused to conduct to a mating terminal. The barrel part and an end of the electric wire are covered with a waterproof case made of resin to be made waterproof. The waterproof case is made of divided two case members, and is formed of the same material as the outer skin of the electric wire.

5 Claims, 8 Drawing Sheets (56) References Cited

U.S. PATENT DOCUMENTS

| | | | |
|---|---|---|---|
| 2001/0003688 A1 | 6/2001 | Kondo | |
| 2002/0127915 A1 | 9/2002 | Kondo | |
| 2010/0144194 A1* | 6/2010 | Umei et al. | 439/521 |

FOREIGN PATENT DOCUMENTS

| | | |
|---|---|---|
| JP | 5784674 | 11/1980 |
| JP | 536448 A | 2/1993 |
| JP | 2001167640 A | 6/2001 |
| JP | 2010-97704 A | 4/2010 |
| WO | 2007116791 A1 | 10/2007 |

OTHER PUBLICATIONS

Written Opinion (PCT/ISA/237), dated Dec. 5, 2012, issued by the International Searching Authority in counterpart International Patent Application No. PCT/JP2012/073967.
Communication dated Jun. 30, 2015 issued by the State Intellectual Property Office of the People's Republic of China in counterpart Chinese Patent Application No. 201280042841.8.
Communication issued on May 26, 2015 by the Japanese Patent Office in related Application No. 2011-198554.
Communication issued on Jun. 23, 2015 by the Korean Patent Office in related Application No. 10-2014-7006242.
Communication dated Jan. 18, 2016, issued by the State Intellectual Property Office of the People's Republic of China in counterpart Chinese Patent Application No. 201280042841.8.
Communication issued Jun. 28, 2016, issued by the State Intellectual Property Office of the People's Republic of China in counterpart Chinese Patent Application No. 201280042841.8.

* cited by examiner

CONNECTOR TERMINAL HAVING A TWO-PART WATERPROOF CASE

CROSS REFERENCE TO RELATED APPLICATIONS

This application is a continuation of PCT application Ser. No. PCT/JP2012/073967, which was filed on Sep. 12, 2012 based on Japanese Patent Application (No. 2011-198554) filed on Sep. 12, 2011, the contents of which are incorporated herein by reference.

BACKGROUND OF THE INVENTION

1. Field of the Invention

The present invention relates to a connector terminal connected to the end of a cable.

2. Description of the Related Art

It is conventionally known that in order to give water resistance, a core wire is exposed from the distal end of a coated electric wire in which the core wire is coated with an insulating coating and a terminal is connected to the core wire and an electrical contact part of the terminal is exposed and also an electric wire connection part of the terminal and the distal end of the coated electric wire connected to the terminal are molded of resin (for example, see PTL 1).

CITATION LIST

Patent Literature

[PTL 1] Japanese Patent Publication No. JP-A-2010-97704

SUMMARY OF THE INVENTION

Incidentally, even when the terminal is simply molded of resin as described above, a resin molding may be peeled from the terminal in the case where an external force acts. Then, when the resin molding is peeled from the terminal, water caused by dew condensation etc. enters this peeled portion, and corrosion resistance of the portion of connection between the electric wire and the terminal decreases.

Particularly when a copper terminal is crimped and connected to an aluminum electric wire, water enters a place of connection between dissimilar metals and thereby, electrolytic corrosion such as dissimilar metal contact corrosion occurs.

The invention has been implemented in view of the circumstances described above, and an object of the invention is to provide a connector terminal capable of obtaining good water resistance and corrosion resistance in a place of connection to a conductor.

The object according to the invention is achieved by the following configurations.

(1) A connector terminal including a barrel part capable of attaching thereto a conductor exposed from an outer skin of an electric wire to cause to conduct and connect, and a terminal part caused to conduct to a mating terminal, the barrel part and an end of the electric wire being covered with a waterproof case made of resin to be made waterproof, wherein the waterproof case is made of divided two case members, and formed of the same material as the outer skin of the electric wire.

(2) A connector terminal as set forth in the above (1), wherein a primer is previously applied to a place making close contact with the waterproof case in the barrel part or a place capable of abutting thereon a conductor in the barrel part.

(3) A connector terminal as set forth in the above (1), wherein the waterproof case is attached by ultrasonic bonding with the two case members mutually butted so as to cover the barrel part and the end of the electric wire.

In the connector terminal with the configuration of the above (1), the waterproof case is formed of the same material as the outer skin of the electric wire, so that a force of adhesion to the outer skin of the electric wire can be increased to more improve water resistance.

In the connector terminal with the configuration of the above (2), the primer is previously applied to a place making close contact with the waterproof case, so that an adhesion force can greatly be increased by improvement in adhesion to the waterproof case in the case of attaching the waterproof case so as to cover the barrel part and the end of the electric wire. Consequently, peeling of the waterproof case due to an external force can be prevented and thus, a place of connection to the conductor of the electric wire can surely be hermetically sealed with the waterproof case to ensure high corrosion resistance for a long time. Therefore, even for connection between dissimilar metals, electrolytic corrosion such as dissimilar metal contact corrosion due to entrance of water to the place of connection can be prevented.

In the connector terminal with the configuration of the above (3), the waterproof case is attached by ultrasonic bonding with the case members mutually butted so as to cover the barrel part and the end of the electric wire, so that as compared with the case of forming a resin molding using a metallic mold, the need for the metallic mold can be eliminated to reduce a manufacturing cost. Also, since it is configured to be covered with the waterproof case, as compared with the case of applying resin to obtain a hermetically sealed state, management of external dimensions can be facilitated and the external dimensions can be made uniform.

According to the invention, the connector terminal capable of obtaining good water resistance and corrosion resistance in the place of connection to the conductor can be provided.

BRIEF DESCRIPTION OF THE DRAWINGS

FIGS. 1A and 1B are views showing a connector terminal according to an embodiment of the invention.

FIGS. 2A and 2B are views showing the connector terminal according to the embodiment to which an electric wire is connected.

FIGS. 3A and 3B are views showing the connector terminal according to the embodiment to which a waterproof case is attached.

FIGS. 4A and 4B are views showing the connector terminal according to the embodiment to which the waterproof case is attached.

FIGS. 6A and 6B are views showing a method for attaching the waterproof case to the connector terminal according to the embodiment.

FIGS. 7A and 7B are views showing a connector terminal of a reference example.

FIGS. 8A and 8B are view showing a connector terminal of another reference example.

DETAILED DESCRIPTION OF THE EXEMPLARY EMBODIMENTS

The invention has been described above briefly. Further, the details of the invention will become more apparent by reading through description of embodiments described below with reference to the accompanying drawings.

An example of an embodiment according to the invention will hereinafter be described with reference to the drawings.

Figure 1A:
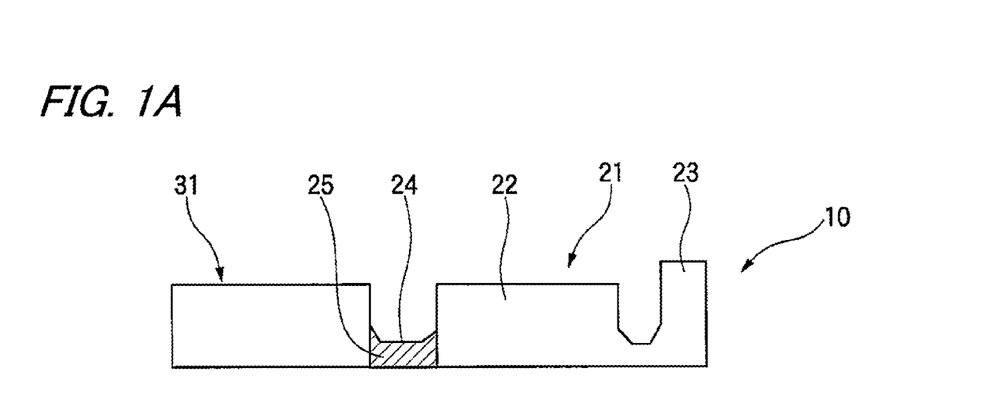
FIG. 1A is a side view.
Figure 1B:
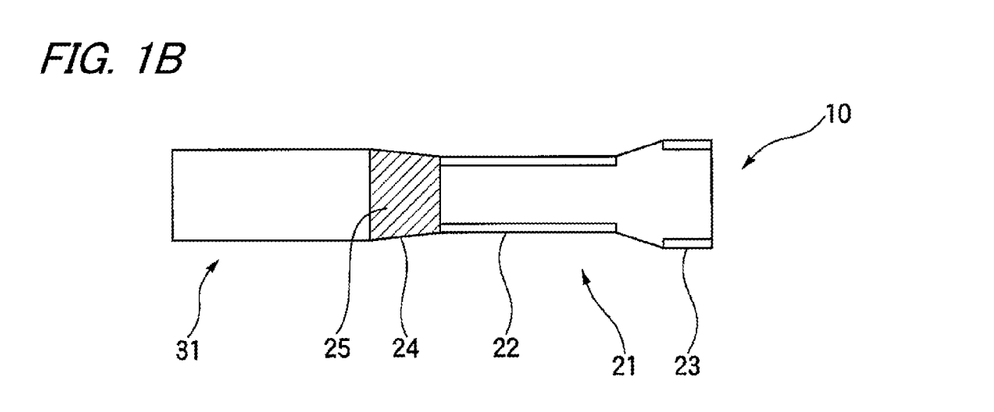
FIG. 1B is a plan view.
Figure 2A:
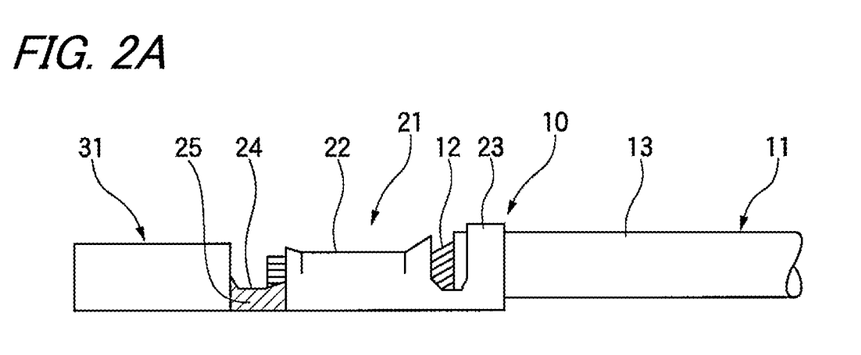
FIG. 2A is a side view.
Figure 2B:
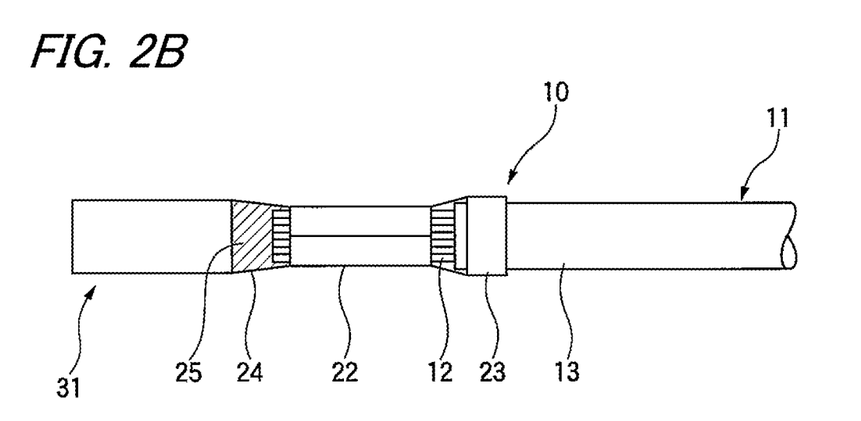
FIG. 2B is a plan view.
Figure 3A:
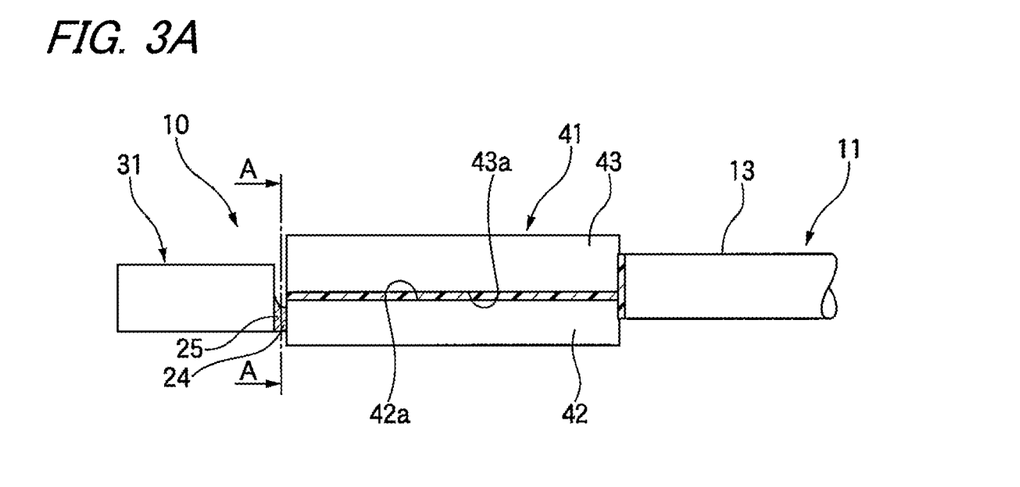
FIG. 3A is a side view.
Figure 3B:
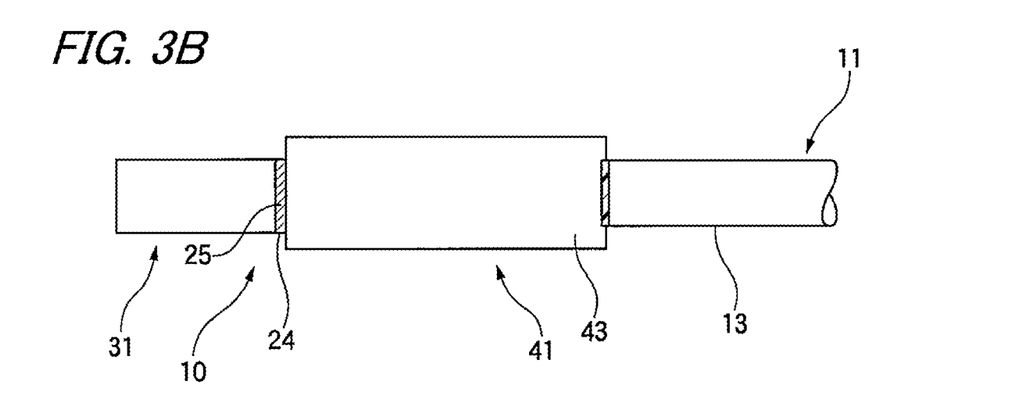
FIG. 3B is a plan view.
Figure 4A:
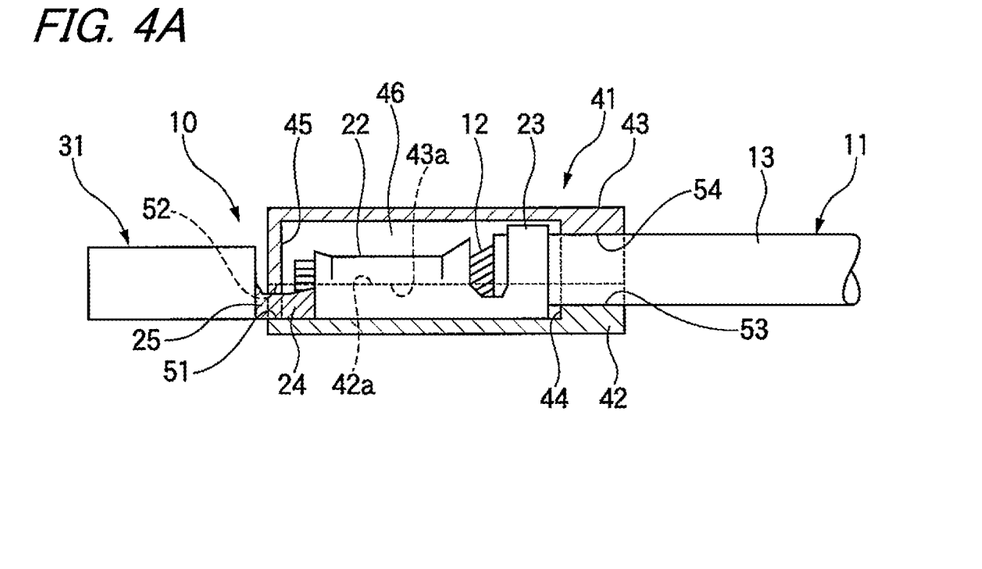
FIG. 4A is a sectional side view.
Figure 4B:
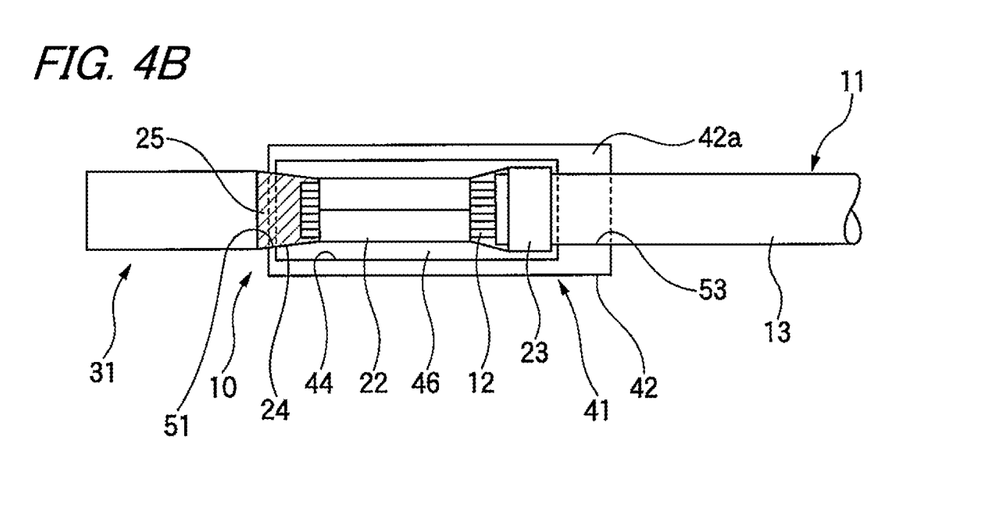
FIG. 4B is a plan view in a state of detaching an upper case.
Figure 5:
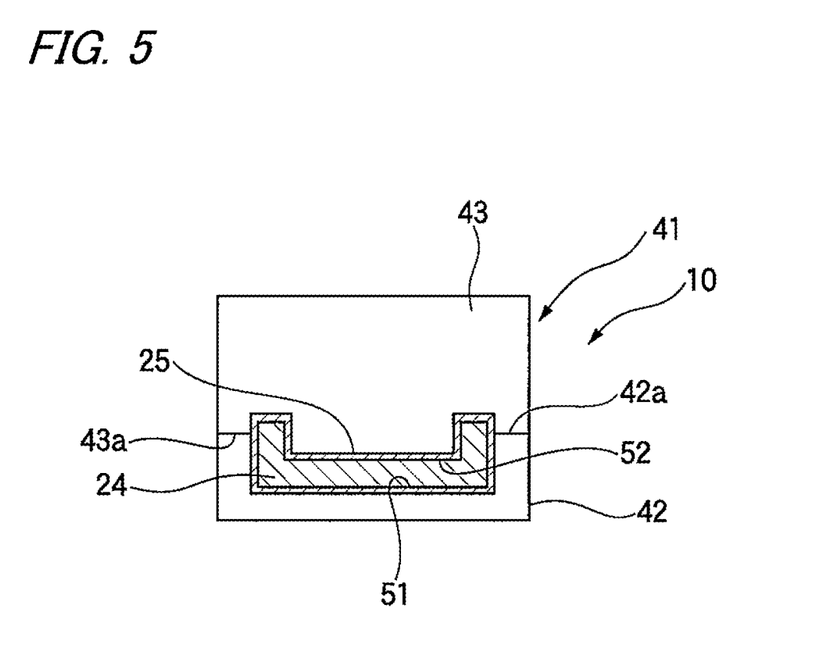
FIG. 5 is a sectional view taken on line A-A in FIG. 3A.
Figure 6A:
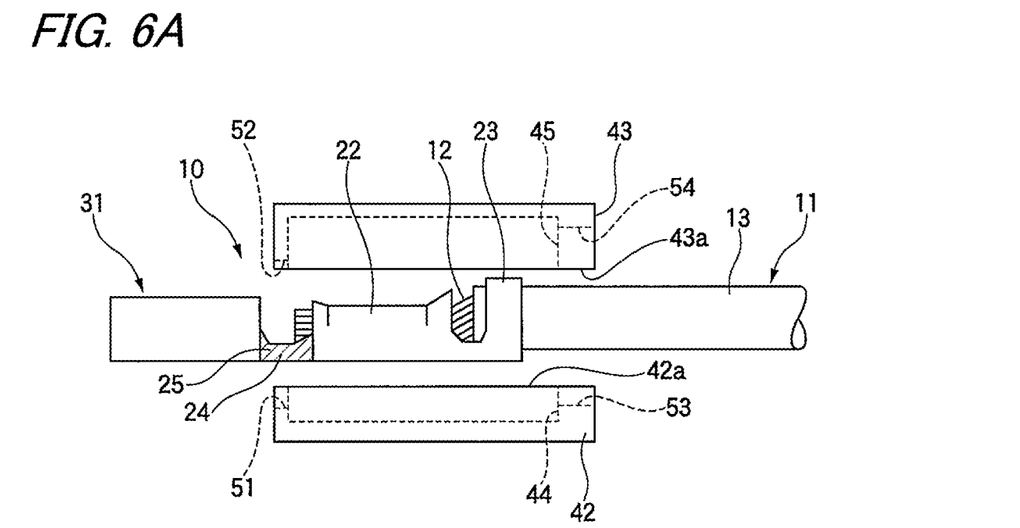
FIG. 6A is a side view.
Figure 6B:
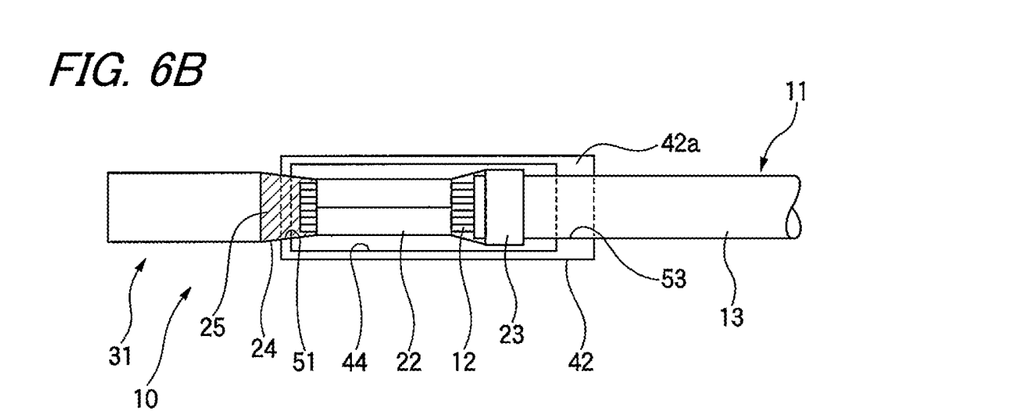
FIG. 6B is a plan view.

FIGS. 1A and 1B are views showing a connector terminal according to the embodiment of the invention and FIG. 1A is a side view and FIG. 1B is a plan view, and FIGS. 2A and 2B are views showing the connector terminal according to the embodiment to which an electric wire is connected and FIG. 2A is a side view and FIG. 2B is a plan view, and FIGS. 3A and 3B are views showing the connector terminal according to the embodiment to which a waterproof case is attached and FIG. 3A is a side view and FIG. 3B is a plan view, and FIGS. 4A and 4B are views showing the connector terminal according to the embodiment to which the waterproof case is attached and FIG. 4A is a sectional side view and FIG. 4B is a plan view in a state of detaching an upper case, and FIG. 5 is a sectional view taken on line A-A in FIG. 3A, and FIGS. 6A and 6B are views showing a method for attaching the waterproof case to the connector terminal according to the embodiment and FIG. 6A is a side view and FIG. 6B is a plan view.

As shown in FIGS. 1A to 2B, a connector terminal 10 is connected to an electric wire 11. This electric wire 11 has, for example, a core wire (conductor) 12 made of aluminum, and an outer skin 13 with which the periphery of this core wire 12 is coated by extrusion.

The connector terminal 10 is formed, for example, by pressing a conductive metal material such as copper or copper alloy, and has a barrel part 21 and a tab terminal part 31.

The barrel part 21 has a core wire crimp part 22 and an outer skin crimp part 23. The core wire crimp part 22 crimps the core wire 12 exposed to the end of the electric wire 11. Consequently, the connector terminal 10 is caused to conduct and connect to the core wire 12 of the electric wire 11. Also, the outer skin crimp part 23 crimps the portion of the outer skin 13 in the end of the electric wire 11. Consequently, the portion of the outer skin 13 of the electric wire 11 is fixed to the connector terminal 10.

Also, the barrel part 21 has a joining plate part 24 in the side of the tab terminal part 31, and the distal end of the core wire 12 of the electric wire 11 crimped to the core wire crimp part 22 is also arranged in the joining plate part 24. In a predetermined position of this joining plate part 24, a primer 25 is applied to an outer peripheral surface and an inner peripheral surface of the position (FIGS. 1A to 4B, FIG. 6A and FIG. 6B show a place to which the primer 25 is applied by oblique lines). The outer peripheral surface of the joining plate part 24 is a surface making close contact with a waterproof case described below, and the inner peripheral surface of the joining plate part 24 is a surface abutting on the core wire 12. This primer 25 is made of synthetic resin having insulation properties, and, for example, polyolefin is used.

The tab terminal part 31 is the portion to which a tab of the other terminal is connected, and the connector terminal 10 is caused to conduct to the other terminal by connecting the tab of the other terminal to this tab terminal part 31. In addition, in the embodiment, the case where the connector terminal 10 has a tab shape in the end making contact with the other terminal is described, but various shapes such as a male shape, a female shape or an LA terminal (earth terminal) can be applied to the end of the connector terminal 10.

As shown in FIGS. 3A to 4B, the connector terminal 10 includes a waterproof case 41. This waterproof case 41 is made of divided two case members. That is, the waterproof case 41 has a half-divided structure constructed of a lower case (case member) 42 and an upper case (case member) 43. These lower case 42 and upper case 43 are molded of synthetic resin having insulation properties, and are molded of the same material as the outer skin 13 of the electric wire 11.

The lower case 42 and the upper case 43 are mutually butted through the barrel part 21 and mutually opposed surfaces 42a, 43a are welded by ultrasonic bonding and the cases 42, 43 are fixed. In the lower case 42 and the upper case 43, recesses 44, 45 are formed in the opposed sides butted mutually. Consequently, the barrel part 21 to which the end of the electric wire 11 is crimped and connected is received in a space part 46 formed by the recesses 44, 45 when the lower case 42 and the upper case 43 are butted.

The sides of the tab terminal part 31 in the lower case 42 and the upper case 43 have terminal close contact recesses 51, 52 with a shape along an external shape of the joining plate part 24 of the barrel part 21. Consequently, in the sides of the tab terminal part 31 in the lower case 42 and the upper case 43, the terminal close contact recesses 51, 52 are brought into close contact with an outer surface of the joining plate part 24 of the barrel part 21 as shown in FIG. 5. Here, the terminal close contact recesses 51, 52 of the lower case 42 and the upper case 43 are brought into close contact in the range in which the primer 25 is applied. Also, the sides of the electric wire 11 in the lower case 42 and the upper case 43 have electric wire close contact recesses 53, 54 with a shape along an external shape of the electric wire 11. Consequently, in the sides of the electric wire 11 in the lower case 42 and the upper case 43, the electric wire close contact recesses 53, 54 are brought into close contact with an outer surface of the electric wire 11.

Then, in the connector terminal 10 having the waterproof case 41 made of the lower case 42 and the upper case 43, the barrel part 21 to which the end of the electric wire 11 is crimped and connected is covered with the waterproof case 41, so that a place of connection to the core wire 12 in this barrel part 21 is made waterproof.

In the case of connecting the electric wire 11 to the connector terminal 10, the outer skin 13 in the end of the electric wire 11 is first cut and removed and the core wire 12 is exposed.

Subsequently, the core wire 12 and the outer skin 13 of the electric wire 11 are respectively crimped to the core wire crimp part 22 and the outer skin crimp part 23 in the barrel part 21 of the connector terminal 10 to which the primer 25 is previously applied as pretreatment in a predetermined position. Consequently, the connector terminal 10 is caused to conduct and connect to the core wire 12 of the electric wire 11.

Next, as shown in FIGS. 6A and 6B, the lower case 42 and the upper case 43 are mutually butted and attached so as to cover the barrel part 21 to which the electric wire 11 is connected, and ultrasonic waves are applied to the cases 42, 43. Then, the mutually opposed surfaces 42a, 43a of the lower case 42 and the upper case 43 are mutually welded by ultrasonic vibration.

At this time, in the terminal close contact recesses 51, 52 of the lower case 42 and the upper case 43, the lower case 42 is extremely well welded to the outer peripheral surface of the joining plate part 24 to which the primer 25 is applied by ultrasonic bonding and also, the upper case 43 is extremely well welded to the inner peripheral surface of the joining plate part 24 to which the primer 25 is applied by ultrasonic bonding. Also, in the electric wire close contact recesses 53, 54 of the lower case 42 and the upper case 43, the lower case 42 and the upper case 43 are extremely well welded to the outer skin 13 of the electric wire 11 by ultrasonic bonding.

Consequently, the barrel part 21 to which the electric wire 11 is connected is covered with the waterproof case 41 made of the lower case 42 and the upper case 43 mutually closely fixed, and is surely made waterproof.

According to the connector terminal according to the embodiment as described above, the waterproof case 41 is formed of the same material as the outer skin 13 of the electric wire 11, so that even when the primer 25 is not applied to the outer peripheral surface of the electric wire 11, a force of adhesion to the outer skin 13 of the electric wire 11 can be increased to more improve water resistance.

Also, according to the connector terminal according to the embodiment, the primer 25 is previously applied to a place making close contact with the waterproof case 41, so that an adhesion force can greatly be increased by improvement in adhesion to the waterproof case 41 in the case of attaching the waterproof case 41 so as to cover the barrel part 21 and the end of the electric wire 11. Consequently, peeling of the waterproof case 41 due to an external force can surely be prevented and thus, as compared with the case of being made waterproof by simply integrally molding a resin molding in a place of connection to the core wire 12 or the case of being made waterproof by applying resin to a place of connection to the core wire 12 and covering the place, the place of connection to the core wire 12 of the electric wire 11 can surely be hermetically sealed with the waterproof case 41 to ensure high corrosion resistance for a long time. Therefore, even for connection between, for example, dissimilar metals of aluminum and copper or copper alloy, electrolytic corrosion such as dissimilar metal contact corrosion due to entrance of water to the place of connection can be prevented.

Also, since the waterproof case 41 is attached by ultrasonic bonding with the lower case 42 and the upper case 43 mutually butted so as to cover the barrel part 21 and the end of the electric wire 11, as compared with the case of forming a resin molding using a metallic mold, the need for the metallic mold can be eliminated to reduce a manufacturing cost. Also, since it is configured to be covered with the waterproof case 41, as compared with the case of applying resin to obtain a hermetically sealed state, management of external dimensions can be facilitated and the external dimensions can be made uniform.

In addition, in the embodiment described above, the primer 25 is applied in a predetermined position of the connector terminal 10 before connection of the electric wire 11, but this primer 25 may be applied after connection of the electric wire 11. In this case, the primer 25 is also applied to a surface of the core wire 12 of the electric wire 11 connected, and adhesion between the core wire 12 and the upper case 43 of the waterproof case 41 can also be improved.

Here, reference examples are shown in FIGS. 7A to 8B in order to describe further advantages of the invention.

Figure 7A:
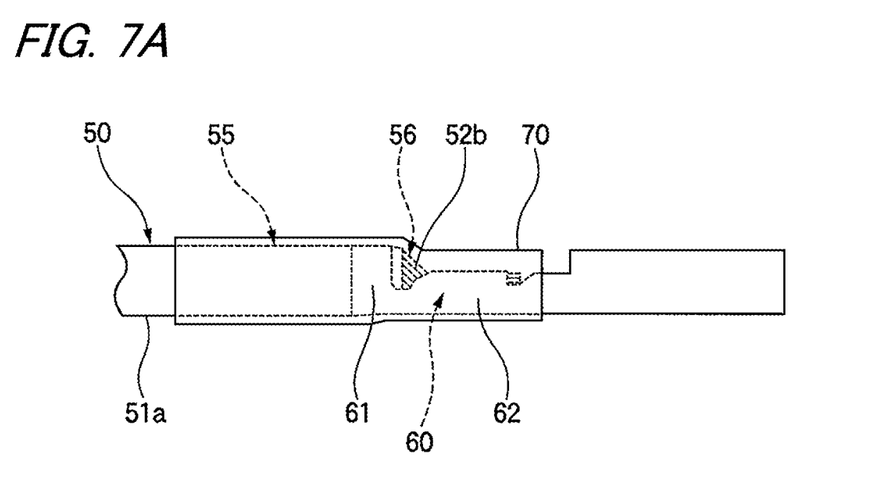
FIG. 7A is a side view.
Figure 7B:
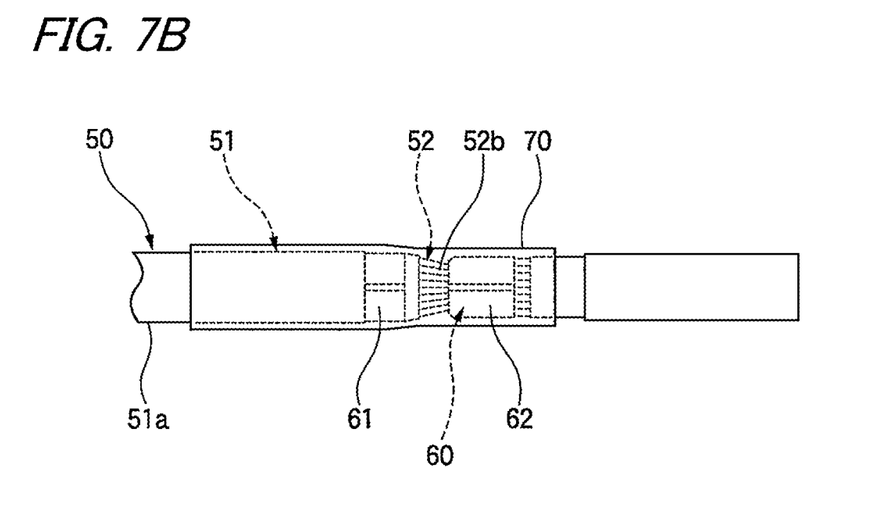
FIG. 7B is a plan view.
Figure 8A:
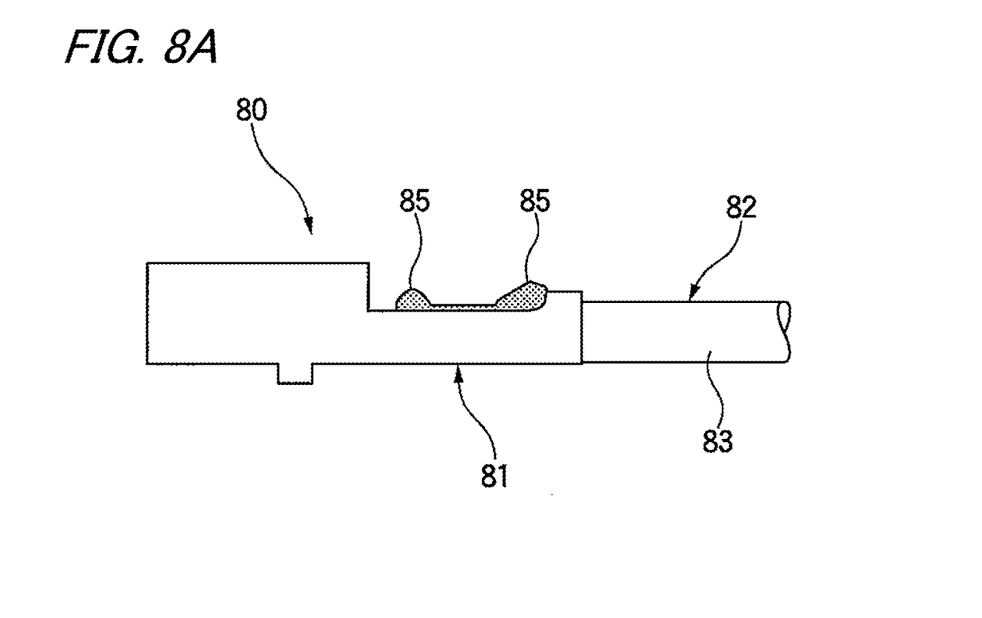
FIG. 8A is a side view.
Figure 8B:
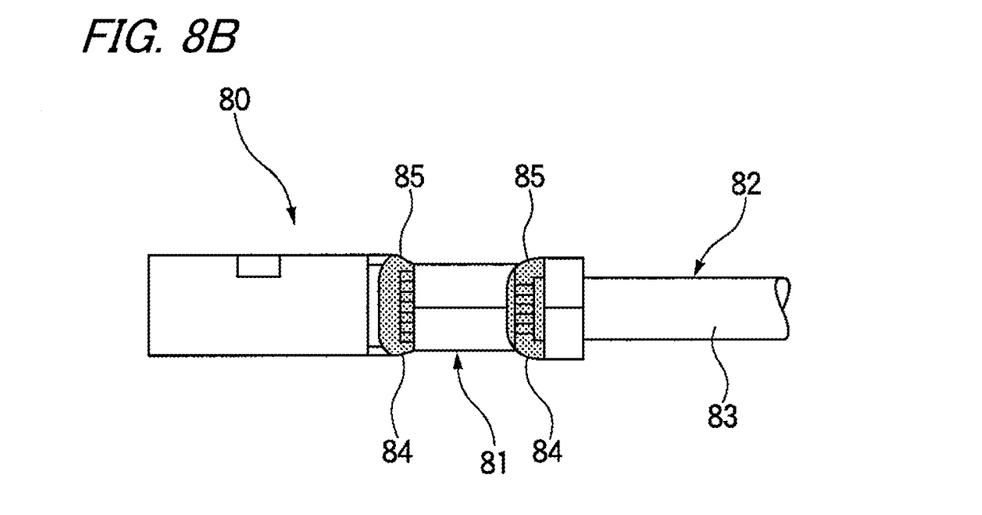
FIG. 8B is a plan view.

FIGS. 7A and 7B are views showing a connector terminal of the reference example and FIG. 7A is a side view and FIG. 7B is a plan view, and FIGS. 8A and 8B are views showing a connector terminal of another reference example and FIG. 8A is a side view and FIG. 8B is a plan view.

As shown in FIGS. 7A and 7B, this connector terminal 60 includes an electric wire 50 having an insulating coating part 55 in which a conductor part 52b is covered with an insulating material 51a, and a conductor exposed part 56 in which the insulating material 51a of the end of the electric wire 50 is removed, a first crimp part 61 crimped to the insulating coating part 55, and a second crimp part 62 crimped to the conductor exposed part 56. This connector terminal 60 has a seal part 70 made of thermoplastic elastomer with which the range including the first crimp part 61 and the insulating coating part 55 of the side extending from the first crimp part 61 toward a direction opposite to the end of the electric wire 50 and the range of the second crimp part 62 are covered in an extension direction of the electric wire 50. The outer periphery of a cross section orthogonal to the extension direction of the electric wire 50 is seamlessly covered with this seal part 70 and this can improve water resistance, with the result that corrosion resistance can be improved.

However, in this connector terminal 60, it is desirable to increase a force of adhesion to the seal part 70 and improve a waterproof effect. Also, in this connector terminal 60, a metallic mold for molding the seal part 70 is required and a manufacturing cost increases.

As shown in FIGS. 8A and 8B, this connector terminal 80 includes a conductor crimp part 81, and a conductor 84 exposed from an outer skin 83 of an electric wire 82 is crimped and fixed to this conductor crimp part 81. Then, in this connector terminal 80, an exposed portion of the conductor 84 crimped and fixed to the conductor crimp part 81 is hermetically sealed by applying a resin 85, and electrolytic corrosion in a connection place is prevented.

However, in the case of this connector terminal 80, a hermetically sealed place is local, so that when an external force acts, the resin 85 is peeled and water enters and corrosion resistance in the portion of connection to the electric wire 82 may decrease. Also, the applied resin 85 has fluidity, so that it is difficult to uniformly apply the resin 85, and it is difficult to make an external shape after application uniform, and it is difficult to manage the dimensions.

In addition, the invention is not limited to the embodiment described above, and modifications, improvements, etc. can be made properly. Moreover, as long as the invention can be achieved, the number of components, materials, shapes, dimensions, arrangement places, etc. of each component in the embodiment described above are arbitrary and are not limited.

The present invention is useful for providing a connector terminal capable of obtaining good water resistance and corrosion resistance in a place of connection to a conductor.

What is claimed is:

1. A connector terminal comprising a barrel part capable of attaching thereto a conductor exposed from an outer skin of an electric wire, and a terminal part adapted to connect to a mating terminal, the barrel part and an end of the electric wire being covered with a waterproof case made of resin to be made waterproof, wherein the waterproof case is made of two divided case members, and formed of the same material as the outer skin of the electric wire, wherein the barrel part has a joining plate at the end of the electric wire which separates the barrel part from the terminal part and the joining plate extends outside the waterproof case, and wherein a primer is previously applied only to the joining plate so that the primer is exposed to outside of the waterproof case.

2. A connector terminal as claimed in claim 1,
wherein the waterproof case is attached by ultrasonic bonding with the two case members mutually butted so as to cover the barrel part and the end of the electric wire.

3. A connector terminal as claimed in claim 1,
wherein the two case members each have a terminal close contact recess which is in close contact with an outer surface of the barrel part.

4. A connector terminal as claimed in claim 1,
wherein the two case members each have a terminal close contact recess which is in close contact with an outer surface of the barrel part, and
the terminal close contact recesses are located close to a location of the primer.

5. A connector terminal as claimed in claim 1, wherein the two case members attach to the joining plate at a first end and attach to the outer skin at the second end to form a waterproof seal.

* * * * *